United States Patent [19]
Jackson

[11] Patent Number: 5,254,321
[45] Date of Patent: Oct. 19, 1993

[54] PROCESS FOR CHROMIUM REMOVAL USING AN INORGANIC SULFUR COMPOUND

[75] Inventor: John R. Jackson, Wilmington, N.C.

[73] Assignee: Huron Tech Corp., Delco, N.C.

[21] Appl. No.: 872,110

[22] Filed: Apr. 22, 1992

Related U.S. Application Data

[63] Continuation-in-part of Ser. No. 759,656, Sep. 13, 1991, abandoned, which is a continuation of Ser. No. 611,796, Nov. 13, 1990, abandoned.

[51] Int. Cl.$^5$ .................... C01G 37/02; B01D 21/00
[52] U.S. Cl. ...................... 423/55; 423/607; 210/720; 210/724
[58] Field of Search .......... 423/55, 607, 475; 210/720, 724

[56] References Cited

U.S. PATENT DOCUMENTS 4,259,297  3/1981  Kaczur et al. .................. 423/55
4,376,099  3/1983  Yamamoto et al. ............. 423/54

FOREIGN PATENT DOCUMENTS

49-27057  3/1974  Japan.
55-119493  9/1980  Japan.

Primary Examiner—John Niebling
Assistant Examiner—Brian M. Bolam
Attorney, Agent, or Firm—Andrew E. Pierce

[57] ABSTRACT

A method has been devised for removing chromium ion from a chromium ion containing liquid and recovering chromium oxide in an usable form by (a) adjusting the temperature of the liquid to an optimal temperature to maximize reduction and simultaneous precipitation of the chromium oxide; (b) adding a reducing agent to the liquid to form a mixture, where the reducing agent is at least one inorganic sulfur compound selected from the group of sulfur compounds where sulfur is in the 4+ oxidation state and (c) adjusting the pH of the mixture to a pH between 5 and 7.

15 Claims, 2 Drawing Sheets

FIGURE 1

PROCESS FOR REMOVAL AND RECYCLE OF CHROMIUM FROM ACTIVE CHLORATE SOLUTIONS

FIGURE 2

PROCESS FOR REMOVAL AND RECYCLE OF CHROMIUM FROM ACTIVE CHLORATE SOLUTIONS

PROCESS FOR CHROMIUM REMOVAL USING AN INORGANIC SULFUR COMPOUND

REFERENCE TO RELATED APPLICATIONS

The present invention is a continuation-in-part of U.S. patent application Ser. No. 07/759,656 filed Sep. 13, 1991 now abandoned which is a continuation of U.S. patent application Ser. No. 611,796 filed Nov. 13, 1990, now abandoned, both of which are relied on and incorporated by reference.

BACKGROUND OF THE INVENTION

The present invention concerns a process for removing chromium from chromium containing liquids. In particular, it concerns removing chromium from aqueous alkali metal chlorate solutions. More particularly, it concerns the removal of alkali metal dichromates from aqueous solutions of alkali metal chlorates by reacting said solutions with inorganic sulfur containing compounds. Most particularly, the present invention is concerned with the removal of sodium dichromate from sodium chlorate solutions.

Chlorate is an oxidizing agent used for the generation of chlorine dioxide, a bleach used in the manufacture of pulp and paper. Chromium, for example in the hexavalent form of $Na_2Cr_2O_7.2H_2O$, is utilized as a catalyst in chlorate manufacturing processes. This catalyst promotes chemical reaction efficiency and inhibits explosive mixtures of hydrogen and oxygen from forming in the chlorate cells.

Historically, chromium was fed with the sodium chlorate/sodium chloride solutions into chlorine dioxide generators. However, the industry is converting over to new, higher capacity methanol driven generators which do not perform as well when chromium is present in the chlorate feed. There is also an environmental concern. Chromium in the hexavalent form is known to be a noted carcinogen. Chromium which is fed to a chlorine dioxide generator eventually ends up in the pulp mill waste treatment system in the trivalent form which in the past has been acceptable to the Environmental Protection Agency. However, the Environmental Protection Agency now requires that total chromium be reported from any and all discharges from pulp and paper mills or from any other user of chromium containing products. Therefore, the chromium now needs to be contained in any process which produces chromium or uses chromium.

Kaczur et al., U.S. Pat. No. 4,259,297, discloses a multistep process for removing hexavalent chromium from impure aqueous alkali metal chlorate solutions. The pH of the impure aqueous solution is adjusted in a first step to a first intermediate pH in the range from about 9 to about 13 before mixing with the reducing chemical. An inorganic sulfur compound is then added. Then, in a second intermediate pH adjustment step where the pH is adjusted from about 2 to about 4, the inorganic sulfur compound reduces the chromium to trivalent and divalent chromium. Finally, in a third intermediate pH adjustment step, the pH is adjusted from about 6 to about 8 and the reduced chromium is precipitated as hydroxides.

Japanese Patent 119493 (1980) discloses a multistep method of removing low levels of chromium (i.e., 0.5 to 50 ppm) from reconstituted chlorate solutions from crystallizers. In this multistep process, hexavalent chromium is reduced by adding sulfite at a pH of from 3 to 6. The amount of sulfite added must satisfy a complex equation which is a function of pH and concentrations. The patent then states that the pH is adjusted from 9 to 11 to precipitate the chromium as hydroxide, but no details are provided as to how this can be accomplished.

Both of the above-described references produce chromium hydroxides which are well known to be difficult to filter. Kaczur discloses an expensive and awkward multistep solid-liquid separation process employing two centrifuging stages and two filtration stages. Japanese Patent 119493 does not address the solid-liquid separation problem. No commercial process exists employing either of these two processes.

In the present invention, there has been discovered a set of conditions which allow the chromium to be simultaneously reduced and precipitated to an easily filtered metal oxide in a single stage process. Because of the process conditions of the present invention, solid-liquid separation can be accomplished on a full scale basis in a single filtration step without the use of clarifiers or centrifuges. A usable chromium precipitate is produced which can be added directly to a chlorate cell as a direct replacement for hexavalent chromium without further processing, essentially creating a closed loop where the benefits of the chromium to the process are retained indefinitely and the chromium never leaves the process.

The present invention offers many advantages: (1) There is no release of noxious by-products such as sulfur or chlorine based gases which are characteristic of most other chromium precipitation processes. (2) Carrying out the process at close to neutral pH eliminates the possibility of $Cl_2$ or $ClO_2$ generation by the break down of chlorate under acidic conditions, and solutions are safe for storage at all points in the process. (3) The sulfur based reducing agents are readily available and, when used in the alkaline solution form, are safe and easy to store and handle without the release of $SO_2$. (4) There are no by-product reaction contaminants in the chromium free chlorate product which could adversely affect the operation of the chlorine dioxide generators. The reaction product is sodium sulfate which is normally present in the salt cake produced by the generators. (5) The resulting chromium precipitate, which is mainly chromium oxide, is more easily filtered than the gelatinous chromium hydroxide precipitates produced by the prior art processes, and filtering can be done inexpensively in a single stage with a filter without the use of a centrifuge. The chromium oxide precipitate collects on the filter as a dense filter cake, therefore the amount of liquid product recycled back to the process is minimized. In applications where the chromium needs to be disposed of or taken to another site for reprocessing (e.g., removing chromium from waste water), having the chromium sludge in the form of a dense filter cake minimizes the total volume of hazardous chemical which has to be handled. (6) The precipitate is in such a form as to be easily converted into a usable form, unlike prior art processes which do not yield chromium in a usable form. (7) The filtered precipitate is in such a form that it is immediately reoxidized back to hexavalent sodium bichromate when mixed with hypo containing solutions or when added to an electrochemical cell where hypochlorite is present. In the chlorate process, the filter precipitate can be added directly back to the chlorate cells as a replacement for the sodium bichromate. (8) There are no flocculating agents or by-product reaction contaminants such as elemental sulfur in the precipitated chromium sludge which would require further processing before the sludge is reused. (9) The present process will work with all concentrations of chlorate and chloride by making slight process temperature adjustments. The process will also work for removing hexavalent and trivalent chromium from waste water streams. (10) The chromium removal process of the present invention, coupled with an upstream Huron high temperature continuous dehypochlorination reactor, can remove essentially 100% of the hypochlorite present in the chlorate cell liquor and eliminate the pH control step normally associated with the dehypochlorination reactor. (11) Unlike prior art processes which utilize several pH adjustment steps from extremely alkaline to extremely acidic for the reduction and precipitation of chromium, the present invention involves a pH close to neutral which is optionally followed by one pH adjustment to the alkaline range. (12) Reaction temperatures are relatively low so exotic materials of construction are not needed.

The present invention allows essentially 100% of the chromium oxide from a chlorate liquid product to be safely and inexpensively removed and recycled without the generation of by-product reaction contaminants and without the release of noxious by-product sulfur or chlorine based gases characteristic of prior art processes. The chromium oxide precipitate can be added back to the chlorate process as a catalyst replacement without further processing. In addition, the process can be utilized to remove chromium from electroplating solutions and chromium plant effluents as well as removal and recovery of chromium from waste site leachants.

SUMMARY OF THE INVENTION

There are several objects of the present invention, including the following: (1) To remove chromium from the chlorate-chloride-chromate containing product of the electrolytic chlorate process, by precipitation, separation and then recycling of the chromium containing residue back to the chlorate process. (2) To remove chromium from various effluents emanating from plants (e.g., such as chromium plants, sodium bichromate production plants) by separating the precipitated chromium from the purified solution, and conversion of the chromium containing residue to a usable product. (3) Treatment of leachants from hazardous waste sites to precipitate the chromium, separation of the residue from the purified filtrate, followed by conversion of the chromium containing residue into a useful product. In this case, other metal ions may also precipitate with the chromium and may be separated by known processes such as selective precipitation or electro separation.

It is another object of the present invention to provide a process for removing chromium from a chromium containing liquid. It is also an object to provide a process to remove chromium from chromium containing aqueous alkali metal chlorate solutions. An additional object is to provide a process for the removal of alkali metal dichromates from aqueous solutions of alkali metal chlorates by reacting said solutions with inorganic sulfur containing compounds.

In one variation, a process for removing chromium from a chromium containing liquid is disclosed which comprises:

(a) adjusting the temperature of the liquid to an optimal temperature to maximize reduction and simultaneous precipitation of the chromium;

(b) adding a reducing agent to the liquid to form a mixture, wherein the reducing agent is at least one inorganic sulfur compound selected from the group of sulfur compounds where sulfur is in the 4+ oxidation state;

(c) adjusting the pH of the mixture to a pH between 5 and 7 to simultaneously reduce and precipitate an easily filterable chromium oxide precipitate;

(d) optionally further adjusting the pH of the mixture to a pH between above 7 to 12; and (e) separating the chromium oxide from the mixture.

Further objects of the present invention will become apparent to those skilled in the art upon a study of the following specification, appended claims, and accompanying drawings.

DETAILED DESCRIPTION OF THE INVENTION

Figure 1:
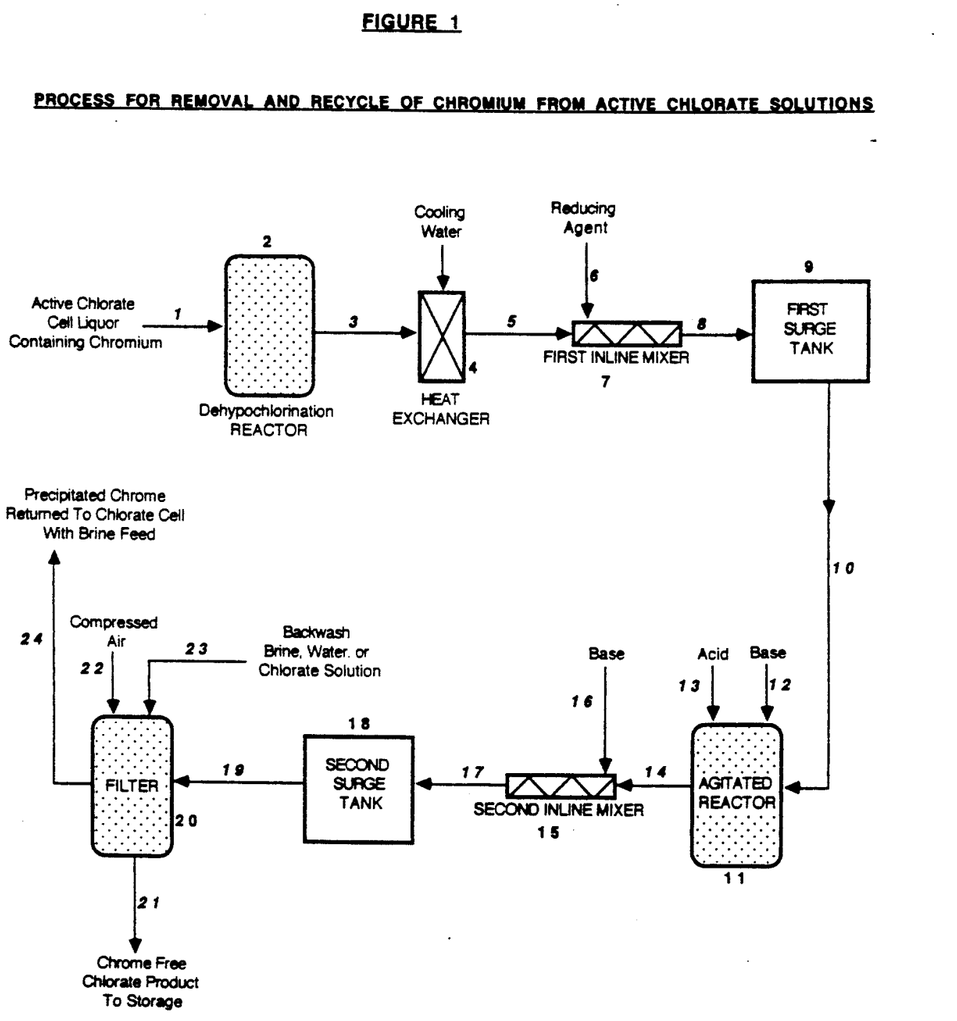
FIGS. 1 and 2 show schematic flow diagrams of two embodiments for removal and recovery of chromium precipitates in accordance with the present invention.

With reference to FIG. 1, an active chlorate cell liquor containing chromium enters a dehypochlorination reactor (2) via line (1) to undergo a dehypochlorination reaction as will be described in detail below. The chlorate solution then exits the dehypochlorination reactor (2) via line (3) to enter a heat exchanger (4) where the desired temperature is achieved by means of cooling water. The chlorate solution then exits the heat exchanger (4) via line (5) to enter the first inline mixer (7), where a reducing agent is added via line (6). The resulting mixture then exits the first inline mixer (7) via line (8) to enter the first surge tank (9). The mixture then exits the first surge tank (9) via line (10) to enter an agitated reactor (11). Base, via line (12), or acid, via line (13), are added to the agitated reactor (11) as needed. The mixture then exits the agitated reactor (11) via line (14) to enter the second inline mixer (15). Base, via line (16), is added to the second inline mixer (15). The mixture then exits the second inline mixer (15) via line (17) to enter the second surge tank (18). The mixture then exits the second surge tank (18) via line (19) to be filtered by a filter (20). Chromium free chlorate product exits the filter (20) via lien (21). The chromium containing filter cake on the filter (20) is backwashed from the filter (20) with a combination of compressed air via line (22) and any one of (a) concentrated sodium chloride brine solution normally used as feed stock to the sodium chlorate cells, (b) active sodium chlorate cell liquor, or (c) water via line (23). The solution containing the chromium is then returned to a chlorate cell via line (24).

Figure 2:
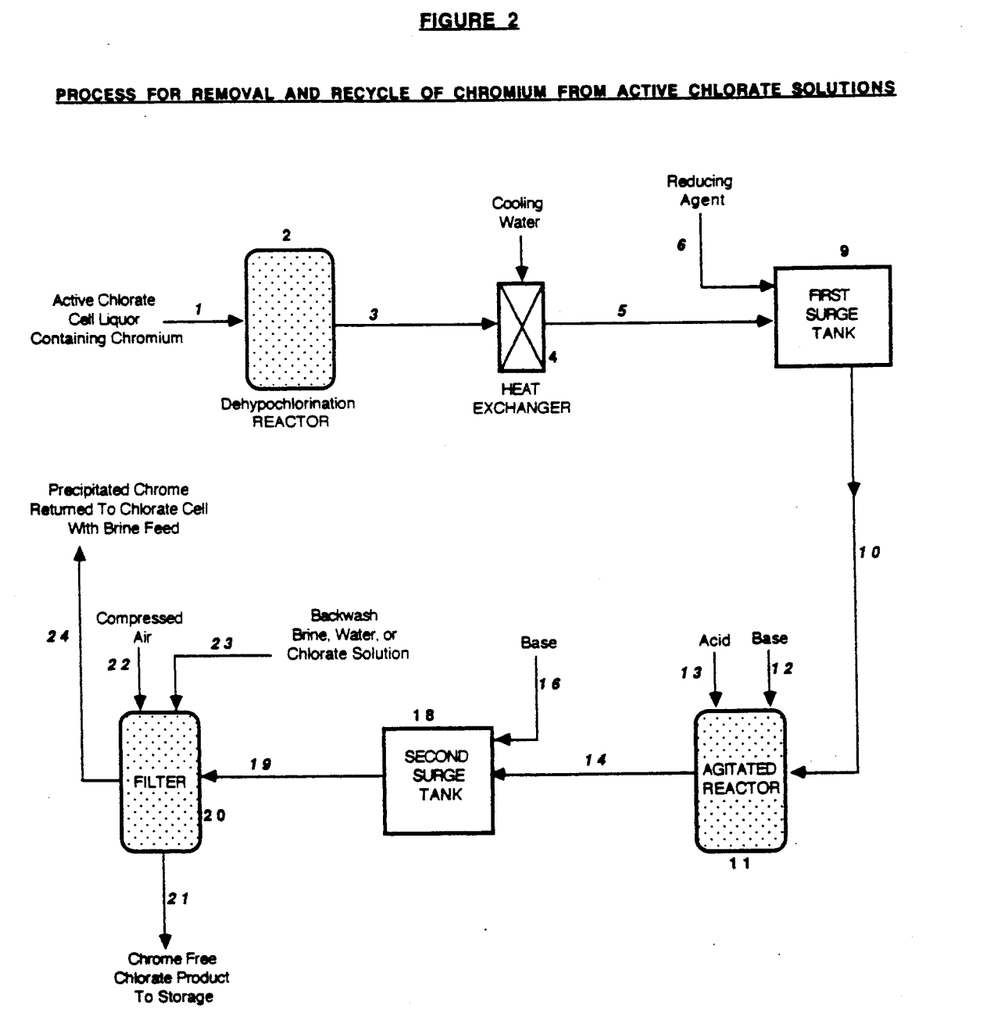

As is well known in this art, the equipment in FIGS. 1 and 2 can vary and/or selected components can be omitted.

Any aqueous solution of alkali metal chlorate which contains reducible chromium may be treated according to the process of this invention.

The present invention applies to treating solutions containing from 10 to 10,000 ppm of chromium ions, especially from 10 to 3,000 ppm. Typical solutions coming from chlorate plants contain at least 200 ppm of chromium. Typical alkali metal chlorates include sodium chlorate. The present invention can also be utilized in removing chromium from waste water, plating solutions, brine, or any aqueous solution. The present invention can also be utilized in treating suspensions, slurries, dispersions, and flowable sludges containing chromium.

The invention is described in terms of an aqueous sodium chlorate solution although any other alkali metal chlorate or chromium containing liquid may be substituted with equivalent results.

As used herein, the term "liquid" is defined to include solutions, suspensions, dispersions, and emulsions. The process can be utilized to treat any waste stream containing chromium. Sludges containing chromium can also be treated.

Chromium is defined to include chromium compounds as ionic species in solution or as solid material suspended in liquid, especially including di-, tri- and hexa-valent forms.

Chromium containing chlorate cell liquor is fed via line (1) through a continuous high temperature dehypochlorination reactor (2) which converts most of the chlorate cell hypochlorite to chlorate. Cell liquor can also come from a batch dehypochlorination process or directly out of the cell. Chlorate cell liquor is an aqueous solution of salts, usually chlorate and chloride, plus a measurable level of hypochlorite (ClO$^-$) present in or discharging from an operating chlorate cell where the liquor pH is controlled at 4–9 and usually at 6–7. Hypochlorite is an intermediate compound formed during the electrolysis of Cl$^-$ to ClO$_3^-$, and under cell conditions exits partially as hypochlorous acid (HClO). Hypochlorite is extremely corrosive and releases a strong, noxious odor which is poisonous and which makes chlorate liquor handling and storage difficult. Therefore, it is desirable to rid chlorate liquors of all hypochlorite upon discharge from the operating cells. This is normally accomplished in prior art processes by the addition of reducing agents in a batch process or by the application of heat with an appropriate retention time in a continuous reactor. In the latter case, the pH has to be strictly controlled to convert all the hypochlorite to chlorate.

The temperature of the chlorate solution as it leaves the dehypochlorination reactor is normally 65°–100° C. Prior to addition of a reducing agent, the chlorate solution temperature is adjusted to a range of 10° to 90° C. in a heat exchanger (4). Typically, chlorate solutions contain from >0 to about 700 gpl NaClO$_3$ and from about 0 to about 300 gpl NaCl. Any combination of NaClO$_3$ and NaCl is possible. Optimum temperature in the present invention is dependent on the combination of chloride and chlorate concentrations in the chlorate liquor. Therefore, it is not possible to specify an optimum temperature for all chromium containing liquids. However, preferred ranges for typical chromium containing solutions are as follows:

600 gpl NaClO$_3$/100 gpl NaCl type solutions: 30° to 45° C., preferably 37° to 43° C.

340 gpl NaClO$_3$/200 gpl NaCl type solutions: 35° to 55° C., preferably 45° to 50° C.

Zero gpl NaClO$_3$/300 gpl NaCl type solutions: 50° to 70° C., preferably 60° to 70° C.

Water only, no chlorate or NaCl: 60° to 90° C., preferably 80° to 90° C.

By a process of trial and error experimentation, and using the above information on specific conditions as a guide, optimum temperature conditions for maximum removal of the chromium can be determined for other specific chromium containing solutions by a person skilled in this art.

At temperatures higher than the preferred range, higher reducing agent/chromium ratios will be needed to reduce all of the chromium. At temperatures lower than the preferred range, all of the chromium will be reduced, but longer retention times will be required for the chromium to precipitate and solid-liquid separation will be more difficult.

The chlorate stream exits the heat exchanger (4) via line (5) and is fed through the first inline mixer (7) where a reducing agent is added via line (6) to the chlorate stream. Alternatively, as seen in FIG. 2, the inline mixer is deleted and the reducing agent is added directly to the first surge tank (9) if a means of mixing is provided. The pH of the chlorate solution prior to addition of the reducing agent is usually 4–7. The reducing agent reduces the chromium from the hexavalent state to the trivalent or divalent state. The reducing agent can react with other heavy metals that might be present. The presence of other heavy metals may affect the amount of reducing agent required.

Reducing agents can be selected from inorganic sulfur compounds in which sulfur is in the 4+ oxidation state. Examples include alkali metal and alkaline earth metal sulfites, bisulfites, metabisulfites, sulfur dioxide or mixtures thereof. These reducing agents can be added as an alkaline solution so they can be easily handled and mixed with chlorate solutions without the generation of dangerous gases. As is known in the art, alkaline solutions can be easily made by mixing with alkaline materials such as sodium hydroxide.

To simplify the description, the reducing agent will be referred to as sodium sulfite or sulfite from here on.

The amount of reducing agent utilized is an amount sufficient to accomplish the desired reduction and simultaneous precipitation of chromium. The sulfite solution is mixed with the chlorate solution in a 2:1 to 15:1 molar ratio of sulfite ion to bichromate ion, preferably 11:1 to 13:1, and most preferably 12:1. The molar ratio would be the same for other reducing agents if they were added in the alkaline form.

Without being bound by theory, the sodium sulfite, when added in this way, immediately reacts with any residual hypochlorite left over from the dehypochlorination reactor (2) according to the reaction:

$$Na_2SO_3 + NaClO \rightarrow Na_2SO_4 + NaCl$$

The free alkalinity in the sulfite solution raises the pH of the chlorate solution to the safe 6.5 to 7.5 range. Therefore, pH control is no longer necessary in the dehypochlorination reactor (2) since the addition of sodium sulfite in (7) guarantees both the complete removal of hypochlorite and pH neutralization. This simplifies the dehypochlorination operation.

The reaction between sulfite and hexavalent chromium produces byproduct OH. ions which raise the pH of the mixture. At a pH over 7 the reaction is slow and at a pH of about 7.5 the reaction essentially stops, which is what happens in the first surge tank (9) when there is no addition of acid to compensate for the OH. ions. The resulting mixture in the first surge tank (9) will contain reduced trivalent chromium ions, precipitated trivalent chromium, and some unreacted hexavalent chromium and sulfite. The reaction between chromium and sulfite will not reach completion until the pH is lowered to <7.0. There is no minimum required time for the mixture to reside in the first surge tank.

The above described chlorate-sodium sulfite mixture in the first surge tank is fed directly via line (10) to an agitated reactor (11) where the chromium is reduced and precipitated. Any suitable means of agitation can be employed but mechanical mixing is preferred in order to give more uniform mixing, better pH control, and fewer operational problems. Sufficient agitation is employed to guarantee homogeneous mixing within 5 to 10 seconds after new material is added. The agitated reactor can be either continuous or batch. A batch reactor is preferred.

In the agitated reactor (11), the pH is controlled to between 5 and 7, and preferably between 5.7 and 6.5, by the addition of any strong base, via line (12), or acid, via line (13), as needed. These pH conditions apply to all chromium containing chlorate solutions, brine, and water. Any acid or base can be utilized provided it does not adversely affect the reactions taking place. HCl and NaOH are preferred. Without being bound by theory, the chromium is reduced from the hexavalent to the trivalent form and precipitates as an oxide in the same step:

$$Na_2Cr_2O_7 + 3Na_2SO_3 + 2HCl \rightarrow Cr_2O_3 + 3Na_2SO_4 + 2NaCl + H_2O$$

The chromium oxide produced by this method is easier to filter than chromium hydroxide produced in prior art processes. Reaction time is 5 to 90 minutes, preferably 15 to 30 minutes. It is possible for the chromium to be reduced from hexavalent to divalent form.

A pH higher than the stated range will require longer reaction times and may result in incomplete reduction or precipitation of chromium. A pH lower than the stated range may result in an incomplete reaction of sulfite with chromium. At very low pHs (e.g., 2 to 4), complete reduction of the chromium can be achieved, but there is a risk of forming dangerous $ClO_2$ and $Cl_2$ gases liberated by the breakdown of chlorate. Also, any excess sulfite will convert to bisulfite and could form $SO_2$. Such gases have been noted in the lab under these low pH conditions. There was also a reversion of the chromium precipitate back to hexavalent chromium whenever chlorine was detected at low pH conditions. The liberated chlorine from the breakdown of chlorate reoxidizes the trivalent chromium to hexavalent chromium:

$$ClO_3^- + 6HCl \rightarrow 3Cl_2 + Cl^- + 3H_2O$$

$$3Cl_2 + 2Cr^{3+} + 7H_2O \rightarrow Cr_2O_7^{-2} + 6HCl + 8H^+$$

This reoxidation of trivalent chromium produces a lot of acid ($H^+$), therefore the mechanism of trivalent to hexavalent chromium reversion by the above two reactions becomes self-sustaining until all the trivalent chromium is reverted. This essentially is the undoing of the reaction between hexavalent chromium and sulfite.

The contents of the agitated reactor (11), including precipitated chromium oxide are pumped via line (14) through the second inline mixer (15) where the optional second and final pH adjustment step takes place. Alternatively, as seen in FIG. 2, the inline mixer is deleted and the reducing agent is added directly to the second surge tank (18) if a means of mixing is provided. The pH is adjusted to between 7 and 12, and preferably between 8 and 9, with an inorganic base, preferably NaOH, which is added via line (16). The pH is adjusted in order to precipitate any residual trivalent or divalent chromium ions left over from the agitated reactor (11), though it is possible for all the chromium to have been precipitated after the initial pH adjustment in the agitated reactor. It is believed that any chromium which precipitates in this optional second pH adjustment step precipitates as a hydroxide. In the preferred pH adjustment range of 8-9, the chromium passes through its minimum solubility point before solid-liquid separation resulting in essentially no chromium in the final chlorate product. This is important where the chlorate solution is to be used in applications where the presence of small amounts of chromium might pose a problem. An additional benefit of the final pH adjustment is to stabilize the chlorate solution against pH changes for safe storage.

The chromium containing chlorate solution from the second inline mixer (15) is preferably fed via line (17) to the second surge tank (18) before it is fed to the filter. There is no specified amount of time for the solution to be held in the second surge tank, however holding times of 0.5 to 4 hours have been found to be beneficial in that the precipitate becomes easier to separate.

Precipitated solutions have good stability as demonstrated by the fact that such solutions have been stored for a few weeks in the lab with no problem. After a few days, the precipitated chromium oxide settles and leaves a layer of clear, chromium free liquid on top which can be decanted off. The surge tank can be deleted and the chromium containing chlorate solution fed directly to a solid-liquid separation step (e.g., filtration) where the chromium oxide precipitate is separated from the chlorate liquid. The solid-liquid separation can be done with any solid-liquid separation method, such as a filter, a clarifier, or a centrifuge. Other processes recommend using a centrifuge, but this has the disadvantage of resulting in a large recycle stream (about 5-10% of the chlorate returned back to the chlorate plant) and the centrifuge usually needs to be followed by a polishing filter. The preferred solid-liquid separation in accordance with the present invention utilizes a ceramic cartridge or teflon woven cloth type filter (20) where the solid-liquid separating can be done in one step to yield a completely clear, chromium ion free chlorate solution. Other types of filters can be used. The ceramic filter has lower capital and maintenance costs than a centrifuge and is inert to active chlorate cell liquor in the event of a hypochlorite breakthrough. A hypochlorite breakthrough occurs when corrosive hypochlorite containing cell liquor has escaped into the solid-liquid separation area where it can corrode materials such as stainless steel utilized in most centrifuges.

The filter (20) can be backwashed with compressed air via line (22) and with water, brine, or active hypochlorite containing chlorate liquor via line (23). The active hypochlorite containing cell liquor reacts with the chromium precipitate to easily convert (oxidize) it back to usable hexavalent chromium, essentially solvent cleaning the filter without disassembling it.

The filtered precipitate can be reoxidized back to hexavalent sodium bichromate when mixed with hypo containing solutions or when added to an electrochemical cell where hypochlorite is present. In the chlorate application, the filter precipitate can be added directly back to the chlorate cells as a replacement for the sodium bichromate.

At least one filter is used in the solid-liquid separation step. Preferably two filters are used, one would be backwashed while the other was in service; these two filters would alternate approximately every 30 minutes. The backwash is recycled back to the chlorate cells via line (24) where, without being bound by theory, it is immediately oxidized back to hexavalent form by the hypochlorite in the cell liquor:

$$Cr_2O_3 + 2NaClO + HClO + H_2O \rightarrow Na_2Cr_2O_7 + 3HCl$$

There was found to be no interference in the operation of the chlorate cells or measurable loss of cell efficiency when the chromium sludge was recycled back to the chlorate process as a replacement for the hexavalent chromium solution normally used.

The clarified, chromium free chlorate product from the solid-liquid separation step goes via line (21) to storage for feed to the chlorine dioxide generators.

From the above it is seen that removal of chromium is dependent on controlling several reaction parameters (e.g., temperature, pH, and amount of sulfite added).

The following examples further illustrate the present invention:

EXAMPLES

Example 1

This example is described with reference to FIG. 1. Twenty ml of an aqueous sodium sulfite solution, via line (6), containing 190 gpl $Na_2SO_3$ was mixed in the first surge tank (9) with 500 ml of a chlorate solution. A first inline mixer was not used. The chlorate solution was made up to simulate what would normally be expected from the dehypochlorination reactor operated without pH adjustment. The chlorate solution contained 620 gpl $NaClO_3$, 70 gpl $NaCl$, 1.5 gpl $Na_2Cr_2O_7.2H_2O$, and 0.2 gpl $NaClO$, pH 4.3, temperature 43° C., dark yellow color, no precipitate. The resulting mixture contained a 12:1 molar ratio of sulfite ion to bichromate ion. The mixture in the first surge tank (9) was allowed to sit unstirred for 24 minutes after which time it contained no hypochloride, pH was 7.2, the color was aqua green, and a very fine chromium oxide precipitate started to form.

After the 24 minute period, the mixture in the first surge tank (9) was metered into a mechanically mixed agitated reactor (11) via line (10) at a rate of 30–35 ml/min. It took approximately 15 minutes to empty the first surge tank (9). The pH in the agitated reactor (11) was controlled at 5.7–6.2 by the addition of 3 M HCl via line (13) while the mixture from the first surge tank (9) was being added. After all of the mixture from the first surge tank (9) was added to the agitated reactor (11), the mixture was allowed to stay in the agitated reactor (11) for 30 minutes over which period the pH was maintained between 5.7–6.2 by adding 4 M NaOH or 3 M HCl, as needed, through lines 12 or 13. At the end of this 30 minute period, the agitated reactor mixture had a temperature of 46° C. and contained a pale blue chromium oxide precipitate.

The agitated reactor mixture was next pumped to the second inline mixer (15) via line (14), where 4 M NaOH was added via line (16) such that the pH of the mixture discharging from the second inline mixer (15) via line (17) was controlled at 8.5–9.0. The flow rate through the second inline mixer (15) was 30–35 ml/min such that the agitated reactor (11) was emptied in approximately 15 minutes. The mixture then flowed into the second surge tank (18), via line (17), where it stayed for 30 minutes.

The mixture in the second surge tank (18) was next pumped via line (19) to a filter (20) which contained 2.5 μ filter paper. The filtered solution carried from the filter (20) via line (21) was found to be completely clear and had no discoloration due to hexavalent or trivalent chromium ion. The chromium oxide precipitate left on the filter pad was pale blue.

In other tests, mixing the sodium sulfite solution with the sodium chlorate solution through the first inline mixer (7) yielded the same results.

Example 2

In a separate example, chromium oxide was precipitated from 75 liters of chlorate solution containing 358 gpl $NaClO_3$, 198 gpl $NaCl$, 1.5 gpl $Na_2Cr_2O_7.2H_2O$, and 0.6 gpl $NaClO$, pH 4.4, with an aqueous solution of sodium sulfite. A single reaction vessel was utilized. The resulting mixture containing the precipitated chromium oxide was pumped through a 2μ aluminum oxide ceramic filter cartridge (20) at a flow rate of 0.3–0.5 gal/ft²/min. The filter cartridge (20) was approximately 12 inches long and ⅜ inches in diameter. The resulting filtrate was completely clear and had no discoloration due to hexavalent or trivalent chromium.

The pressure drop across the filter cartridge (20) built up to 60 psi after 30 minutes of pumping. At this point, the pumping was stopped and the filter cartridge (20) inspected. It was found to be uniformly coated with a dense, pale blue filter cake approximately 3/16–¼ inches thick.

In separate tests, the chromium oxide containing filter cake was successfully backwashed from the filter cartridge (20) with a combination of compressed air via line (22) and any one of (a) concentrated sodium chloride brine solution normally used as feed stock to the sodium chlorate cells, (b) active sodium chlorate cell liquor, or (c) water via line (23). In all cases, backwashing was accomplished in less than 3 minutes after which time the filter cartridge (20 could be returned to service and the cycle repeated.

Example 3

In a separate example following the same conditions as example 2, chromium ion was precipitated from 100 liters of chlorate solution containing 315 gpl $NaClO_3$, 185 gpl $NaCl$, and 1.5 gpl $Na_2Cr_2O_7.2H_2O$ with an aqueous solution of sodium sulfite. A single reaction vessel was utilized. A solution containing the precipitated chromium oxide was then fed to an operating chlorate cell via line (24) for 12 hours at a rate which allowed the contents of the chlorate cell to be changed over every 2.5 hours, thus replacing the hexavalent chromium ion catalyst present in the cell at the beginning of the test with precipitated chromium oxide from the process of the invention. The precipitated chromium was immediately converted back to hexavalent chromium ion upon contact with the active cell liquor. There was no change in the visual appearance of the cell liquor over the test period and no undissolved precipitate. There was also no measurable change in the operation or performance of the chlorate cell over the test period while the solution containing the chromium oxide precipitate was being added versus the period prior to adding the solution.

Example 4

This example is described with respect to FIG. 1. In a pilot plant, approximately 2 gallons per minute side stream of sodium chlorate solution containing 320 gpl $NaClO_3$, 188 gpl $NaCl$, 1.33 gpl $Na_2Cr_2O_7.2H_2O$, temperature 65°–70° C. was taken from the dehypochlorination reactor (2) discharge line via line (3) in an operating sodium chlorate plant and treated to remove the chromium. The solution passed through the heat exchanger (4) after which the temperature was 45°-50° C., and then into the top of a 200 gallon first surge tank (9) via line (5). No first inline mixer was used. An aqueous sodium sulfite solution containing 185 gpl $Na_2SO_3$ was added to the top of the first surge tank (9) via line (6) at the same time as the chlorate solution was being added such that the 2 streams contacted each other before they reached the liquid level. The sodium sulfite feed rate was controlled such that the resulting mixture contained an 11:1 to 12:1 molar ratio of sulfite ion to bichromate ion.

After about 30 minutes and while the 2 streams were still being added to the first surge tank, liquor was pumped from the first surge tank to a 100 gallon mechanically mixed agitated reactor via line (10) such that it took 17 minutes to fill the agitated reactor (11). The pH of the agitated reactor was controlled at 6-6.2 by the addition of 3 M HCl through line (13) while the agitated reactor was being filled. After the agitated reactor was full, its contents were stirred for 30 minutes over which period the pH was maintained between 5.7-6.2 by adding 3 M HCl or 4 M NaOH, as needed, through lines 12 and 13. At the end of this 30 minute period, the agitated reactor, mixture had a temperature of 46° C. and contained a pale blue chromium oxide precipitate.

The agitated reactor mixture was next pumped through the second inline mixer (15) via line (14) where 4 M NaOH was added via line (16) such that the pH of the mixture discharging from the inline mixer via line (17) was controlled at 7.5-9. The flow rate through the second inline mixer (15) was such that the agitated reactor (11) was emptied in 20 minutes. The mixture in line (17) flowed into a 200 gallon second surge tank (18).

The mixture in the second surge tank (18) contained all of the original hexavalent chromium in the converted form of a chromium oxide precipitate. This mixture was next pumped via line (19) through a 2μ ceramic cartridge filter (20). The filtered solution carried from the filter via line (21) was found to be completely clear and had no discoloration due to hexavalent or trivalent chromium.

This cycle was repeated dozens of times over several days such that a continuous stream of orange-yellow chlorate solution flowed into the process and the continuous stream of clear, chromium ion free chlorate solution flowed out of the process. The filter was periodically backwashed with brine via line (23) and compressed air via line (22) when the pressure drop across the filter exceeded 62 psi. The chromium oxide precipitate sludge flushed out of the filter was pumped into the brine stream feeding the chlorate plant via line (24) where it was recycled through the chlorate process.

Example 5

Sodium bichromate was removed from a sodium chlorate solution. A single reaction vessel was utilized, but the reducing chemical was a 3:1 molar ratio of $Na_2SO_3$ to $NaHSO_3$ added in a molar ratio of reducing agent to bichromate ion of 12:1. The sodium bisulfite lowered the total acid requirement for the process while giving essentially the same chromium free product as example 1 utilizing just sodium sulfite.

Example 6

Sodium bichromate was removed from an aqueous solution of sodium chlorate according to the general procedure of example 1, but the reducing chemical was $SO_2$ dissolved in a sodium hydroxide solution such that the molar concentration of $SO_2$ in the sodium hydroxide solution was 1.55 mole/liter. The reducing chemical was mixed with the chromium containing chlorate solution such that the molar ratio of $SO_2$ to bichromate ion in the resulting mixture was 12:1. An essentially chromium free chlorate product was achieved.

Example 7

Sodium sulfite solution was used to precipitate chromium oxide from a tap water solution containing $Na_2Cr_2O_7$. A single reaction vessel was utilized. The tap water contained 1.5 gpl $Na_2Cr_2O_7.2H_2O$, at a pH of 5-6. The temperature of the water was maintained at 80°-90° C. The procedure yielded a pale blue chromium oxide precipitate which was easily filtered with 2.5μ filter paper leaving behind essentially chromium ion free water.

Example 8

Sodium bichromate was removed from sodium chlorate solutions and water solutions at various conditions of pH temperature and sulfite ion:bichromate ion molar ratio as shown in table 1. The tests were carried out in a single 1 liter beaker and filtering was done through 2.5μ filter paper. Five hundred ml quantities of chromium ion containing solutions were used. Chlorate solutions were made up to 340 gpl $NaClO_3$, 200 gpl NaCl, 1.20 gpl $Na_2Cr_2O_7.2H_2O$, 0.2 gpl NaClO, pH 4.3. Water solutions contained 1.2 gpl $Na_2Cr_2O_7.2H_2O$.

These examples indicate some of the conditions under which the process will work and also show that the preferred conditions give the best results.

The above examples can be reproduced in a similar way where sodium sulfite is replaced by a reducing agent selected from inorganic sulfur compounds where sulfur is in the 4+ oxidation state.

This process can be applied to remove chromium ion from ground water or from plating shop rinse solutions or from any other chromium ion containing solution. In some cases, where the chromium ion containing solution has a high acid content, the solution might have to be neutralized with a base prior to addition of the reducing chemical.

U.S. Pat. No. 4,259,297 is incorporated by reference for a discussion of the prior art and methods known in the art.

*Encyclopedia of Chemical Technology*, by Kirk-Othmer, Third Edition, Volume 5, pages 633-645 is incorporated by reference for a description of a variety of electrochemical cells for the production of sodium chlorate.

Further variations and modifications of the invention will become apparent to those skilled in the art from the foregoing and are intended to be encompassed by the claims appended hereto.

TABLE 1

| Test # | Solution Type | Sulfite:Bichromate Ion Mole Ratio | Temp. °C. | pH in Batch Reactor Step | Results |
|---|---|---|---|---|---|
| A | Chlorate | 13:1 | 45–50 | 6.0–6.1 | Filtrate was had slight blue cast indicating a trace of trivalent chromium. |
| B | Chlorate | 15:1 | 48–51 | 4.1–4.7 | Filtrate had a blue color indicating detectable levels of trivalent chromium. |
| C | Chlorate | 15:1 | 50–52 | 2.4–2.5 | Bluish yellow color indicating both trivalent and hexavalent chromium. |
| D | Chlorate | 3.7:1 | 48–51 | 6.0–6.2 | Filtrate was yellow indicating hexavalent chromium. Analysied 0.55 sodium bichromate vs 12.0 gpl in original solution = 54% removal. |
| E | Water | 15:1 | 46–49 | 5.8–6.1 | Chromium took several hours to precipitate after a final pH adjustment of 8.5–9.0. After precipitation, the filtrate was clear and had no color of hexavalent or trivalent chromium. |
| F | Water | 15:1 | 62–64 | 5.8–6.1 | Chromium did not precipitate until final pH adjustment of 8.5–9.0. but then precipitated immediately. The filtrate was clear with no discoloration of hexavalent or trivalent chromium. |
| G | Water | 15:1 | 70–72 | 5.7–6.0 | Same as test F. |
| H | Water | 15:1 | 87–90 | 5.8–6.1 | Chromium precipitated at pH 5.8–6.1. Final filtrate was clear and had no discoloration of hexavalent or trivalent chromium. |

What is claimed:

1. A process for the removal of chromium from a first, aqueous liquid or sludge, said process comprising:
   A) adding to said first, aqueous liquid or sludge a reducing agent selected from the group consisting of an inorganic sulfur containing compound in which sulfur is present in the 4+ oxidation state, said inorganic sulfur containing compound being added in an amount to react with said chromium in said first, aqueous liquid or sludge,
   B) reacting at a temperature of about 30° to about 55° C. and a pH of about 5 to about 7 in order to precipitate a chromium compound comprising substantially chromium oxide, and
   C) separating said chromium oxide from said first aqueous liquid or sludge to obtain a second, aqueous liquid characterized as essentially chromium ion free.

2. The process of claim 1 wherein said first aqueous liquid comprises an alkaline earth metal chlorate or an alkali metal chlorate, an alkali metal or an alkaline earth metal chloride, and chromium in the divalent, trivalent, or hexavalent state,
   wherein said reducing agent is a sulfur containing compound selected from the group consisting of an alkali metal or an alkaline earth metal sulfite, bisulfite, metalbisulfite, sulfur dioxide, and mixtures thereof, and
   wherein said chromium oxide is separated from said aqueous solution by filtration;
   wherein said process is conducted at a reaction temperature of about 30° C. to about 90° C.

3. The process of claim 2 wherein said aqueous, alkali metal chlorate is present in the amount of up to about 600 grams per liter, said chromium is present as chromium ions, and said process is conducted at a reaction temperature of about 35° C. to about 55° C. and a pH of about 5.7–6.5.

4. The process of claim 2 wherein said aqueous alkali metal chlorate is sodium chloride.

5. The process of claim 3 wherein said reducing agent is sodium sulfite which is present in a molar ratio of sulfite ions to said chromium ions, present as bichromate ions, of 2:1 to 15:1.

6. The process of claim 3 wherein said reducing agent is a mixture of sodium sulfite and sodium bisulfite.

7. The process of claim 3 wherein said reducing agent is sulfur dioxide which is present in an aqueous solution of sodium hydroxide.

8. The process of claim 3 including a subsequent reaction at a pH of 7–12.

9. A process for the recycling of chromate values which are present as chromium ions in a first, aqueous, solution comprising an alkaline earth metal or alkali metal chlorate for use as a feed for a chlorine dioxide generator
   wherein said chromium ions are removed from said first, aqueous, alkaline earth metal or alkali metal chlorate solution to produce a second, aqueous, alkali or alkaline metal chlorate solution characterized as essentially chromium ion free prior to feeding said second chlorate solution to said chlorine dioxide generator and
   wherein compounds comprising substantially chromium oxide are separated from said first, aqueous solution and recycled to an electrolytic cell for the production of an alkali or alkaline earth metal chlorate, said process comprising:
   A) adding to said first, aqueous, alkali metal or alkaline earth metal chlorate solution a reducing agent selected from the group consisting of a sulfur containing compound in which sulfur is present in the 4+ oxidation state, said sulfur containing compound being present in an amount required to react with said chromium ions present in said first, aqueous, chlorate solution,
   B) reacting said first aqueous chlorate solution with said reducing agent at a pH of about 5 to about 7 to form a chromium compound comprising substantially chromium oxide,
   C) separating said chromium oxide from said first, aqueous, chlorate solution to obtain a second, aqueous, chlorate solution,
   D) recycling said chromium oxide to said electrolytic cell for the production of an alkali metal or alkaline earth metal chlorate, and E) feeding said second, aqueous, chlorate solution to a reactor for the generation of chlorine dioxide.

10. The process of claim 9 wherein said first, aqueous, chlorate solution comprises an alkali metal chlorate, an alkali metal chloride, and chromium in the divalent, trivalent, or hexavalent state
wherein said alkali metal chlorate is present in an amount of up to about 600 grams per liter,
wherein said first, aqueous, chlorate solution contains chromium ions in the amount of about 10–10,000 parts per million, and
wherein said process is conducted at a reaction temperature of about 30° C. to about 90° C.

11. The process of claim 10 wherein said reducing agent is a sulfur containing compound selected from the group consisting of and alkali metal or alkaline earth metal sulfite, bisulfite, sulfur dioxide, and mixtures thereof and said reaction temperature is about 35° C. to about 90° C.

12. The process of claim 11 wherein said reducing agent is sodium sulfite which is present in a molar ratio of sulfite ions to chromium ions, present as bichromate ions, of 2:1 to 15:1.

13. The process of claim 11 wherein said reducing agent is a mixture of sodium sulfite and sodium bisulfite.

14. The process of claim 11 wherein said reducing agent is sulfur dioxide which is present in an aqueous solution of sodium hydroxide.

15. The process of claim 11 including a subsequent reaction at a pH of 7–12.

* * * * *

UNITED STATES PATENT AND TRADEMARK OFFICE
CERTIFICATE OF CORRECTION

PATENT NO. : 5,254,321
DATED : October 19, 1993
INVENTOR(S) : John R. Jackson

It is certified that error appears in the above-indentified patent and that said Letters Patent is hereby corrected as shown below:

In column 12, lines 19 and 20, the formula should read ---$Na_2Cr_2O_7 \cdot 2H_2O$---.

In column 13, line 51, "metalbisulfite" should read ---metabisulfite---, line 54, after "filtration;" the semicolon should be replaced by a period, and the remainder of the claim in lines 55 and 56 should be deleted.

In column 16, line 2, after "bisulfite," ---metabisulfite,--- should be inserted.

Signed and Sealed this

Sixth Day of September, 1994

Attest:

BRUCE LEHMAN

Attesting Officer

Commissioner of Patents and Trademarks